2,711,416

DEHYDRATION OF CASTOR OIL

Ronald J. Carter, Slough, John S. Gourlay, Maidenhead, and James K. Lovell, Slough, England, assignors to Imperial Chemical Industries Limited, a corporation of Great Britain No Drawing. Application February 25, 1952, Serial No. 273,350

10 Claims. (Cl. 260—405.5)

This invention relates to a process for the dehydration of castor oil.

Castor oil, the triglyceride of a hydroxylated $C_{18}$ fatty acid, is a non-drying oil and has limited use in coating compositions. Its non-drying property is due to the fact that the fatty acid contains only one double bond per molecule whereas the fatty acids of drying oils contain two or three double bonds per molecule. By heating castor oil or its fatty acids to high temperatures the hydroxyl group is split off in the form of water and a second double bond is introduced into the fatty acid molecule. As a result, dehydrated castor oil is a drying oil and is of considerable value in coating compositions.

Many processes of dehydrating castor oil either directly or indirectly through the separated fatty acid have been suggested and the simplest of these is merely to heat a batch of the oil in a kettle to between 260° and 300° C. at which temperature dehydration will take place, hold the batch at that temperature until the required degree of dehydration is obtained, and then allow the batch to cool down. Although the process may be accelerated by means of catalysts it still takes several hours and is not wholly satisfactory since prolonged heating of the oil at the high temperatures involved results in decomposition and polymerisation of the dehydrated oil. Decomposition reduces the yield and polymerisation beyond a certain degree results in an oil unsuitable for the manufacture of monoglycerides to be used in alkyd resins.

If, in an attempt to increase production, the size of batch is increased then the effect of these secondary and undesirable reactions becomes more pronounced: heat transfer requirements make it difficult rapidly to heat and cool large batches and the result is that the oil is maintained at high temperatures for undesirably long periods.

According to the present invention castor oil is dehydrated by a process comprising continuously passing castor oil and a dehydration catalyst into a vessel in which the mixture is vigorously agitated and maintained at a temperature of 260°–375° C., the treated oil being withdrawn at such a rate as to maintain a substantially constant volume of liquid in the vessel, the ratio of said volume to the volume of castor oil added per minute being from 0.5:1 to 10.0:1.

The oil and catalyst may be passed into the dehydration vessel either separately or as a mixture.

In order to obtain a good degree of dehydration in the short reaction times of the present invention it is desirable that the water produced in the course of the reaction should be removed from the reaction mixture as rapidly as possible. To facilitate evolution of the water vapour the pressure at which the reaction is carried out should be not substantially greater than atmospheric and, where a particularly high degree of dehydration is required, may advantageously be less than atmospheric. It is also preferred that the reaction be carried out in a vessel in which the reaction mixture has a free exposed surface through which the water vapour may be continuously evolved during the reaction rather than in a confined space as in, say, a tubular type of reactor.

The ratio oil volume: oil input may be termed the average reaction time and since in our invention this time is so very short the effects of the secondary reactions referred to above are reduced to a minimum. In particular polymerisation of the dehydrated oil may be substantially eliminated and by our process it is possible to dehydrate castor oil to a degree not less than 85%, the viscosity of the dehydrated oil being not more than 1.5 poises at 25° C. Such dehydrated castor oil has not before been produced on a commercial scale. An advantage of our process is that the castor oil on entering the vessel is substantially instantaneously heated to reaction temperature and since it can be rapidly cooled on leaving the vessel it is maintained at an elevated temperature only for a minimum period during which dehydration is effected. The disadvantages of long heating up and cooling down periods and the lack of precise control associated with dehydration of large batches of oil are avoided and yet high rates of output may be achieved.

*Example I*

A pot-like vessel of ⅛ gallon working capacity with means for vigorously agitating the contents and for maintaining them at 285° C. was used to dehydrate castor oil containing as catalyst 0.8% by weight of concentrated sulphuric acid. The oil and catalyst were premixed at room temperature and the mixture was run into the reaction vessel at a constant rate. The effluent was rapidly cooled to a temperature of less than 200° C. at which the rate of polymerisation of the dehydrated oil was negligible. The vapours evolved from the reaction mixture were drawn off into a condenser by means of an exhaust fan. The output obtained was 7 gals./hour of dehydrated castor oil having the following constants:

Acid value_____ 11.2 mgms. KOH/gm.
OH value_____ 34.4 mgms. KOH/gm.
Viscosity_____ 1.37 poises at 25° C.
Refractive index_____ 1.4838 at 20° C.
T. I. V. (Woburn)_____ 153.6.
Colour_____ 8 P. R. S. units The rate of output compares very favourably with that of known batch processes. For example, a usual time cycle for an 800 gallon batch of oil is 10 hours, this being equivalent to a rate of production of 0.1 gallon per hour per gallon capacity of the vessel. In the continuous process described above the rate of production is 56 gallons per hour per gallon capacity of the vessel.

*Example II*

The process described in Example I was used to dehydrate castor oil containing as catalyst 1.6% by weight of concentrated sulphuric acid. With a reactor temperature of 310° C. the output obtained was 6 gals./hour of dehydrated castor oil having the following constants:

Acid value_____ 12.8 mgms. KOH/gm.
OH value_____ 21.4 mgms. KOH/gm.
Viscosity_____ 1.26 poises at 25° C.
T. I. V. (Woburn)_____ 163.
Colour_____ 9 P. R. S. units.

The rate of output of the continuous process may be raised by increasing the working capacity of the dehydration vessel. However, an important feature of the process is that high rates of input of cold oil demand a correspondingly high rate of heat input into the vessel. If the vessel is kettle-shaped then as its size is increased its working capacity increases at a much greater rate than the heat-transfer area. The rate of oil input being dependant upon the heat-transfer area, a point is soon reached at which the low oil volume: oil input ratio characteristic of this invention is difficult to maintain. For very high rates of output then it is preferable to operate a series of small vessels connected in parallel. Alternatively, a trough-shaped vessel may be used, the oil flow being across and not along the axis of the trough.

The heat input demands in the dehydration vessel may be reduced by preheating the castor oil feed but where this is added in admixture with the catalyst, the mixture should not be maintained at a preheat temperature of more than 100° C. for long periods, otherwise the effects of the reactions which occur at these temperatures will become considerable, and the character of the process, namely, the relatively short period of heat-treatment, will tend to be lost. The maximum length of time permissible will depend on the actual temperatures and on the nature and proportion of the catalyst.

*Example III*

Cold castor oil mixed with 0.4% by weight of concentrated sulphuric acid was continuously passed through a heat exchanger in which its temperature was raised to 180° C. and then into a pot-like reaction vessel of 6 gallons working capacity. In the reaction vessel the mixture was vigorously stirred and maintained at a temperature of 275° C. The dehydrated oil overflowed through an outlet in the side of the vessel and passed back into the heat exchanger where in heating up the incoming castor oil, it was cooled to below 200° C. Water vapour and other volatile matter produced in the reaction vessel was led off through a wide fume duct into a condenser. The output obtained was 40 gals./hour of dehydrated castor oil having the following constants:

Acid value _____ 13.7 mgms. KOH/gm.
OH value _____ 49 mgms. KOH/gm.
Viscosity _____ 1.90 poises at 25° C.
Colour _____ 2.5 P. R. S. units.

The difficulties of premature reaction which may occur in preheating catalysed oil may be avoided by preheating uncatalysed oil and adding the catalyst, preferably diluted with a further quantity of cold or moderately warm oil, to the mixture in the reaction vessel.

*Example IV*

To a pot-like vessel of ⅛ gallon working capacity were continuously added raw castor oil at a temperature of 285° C. and a cold mixture of raw castor oil with 2% by weight of concentrated sulphuric acid, the proportion of hot oil to cold oil being 4:1. The reaction mixture was vigorously agitated and maintained at a temperature of 350° C., the evolved vapours being drawn off through a condenser. The overflow of oil from the vessel was rapidly cooled to below 200° C. and the output was 10 gallons/hour of dehydrated castor oil having the following constants:

Acid value _____ 10.2 mgms. KOH/gm.
OH value _____ 43.0 mgms. KOH/gm.
Viscosity _____ 1.38 poise at 25° C.
Colour _____ 3.5 P. R. S. units.

It was found that if the undiluted sulphuric acid catalyst was added directly to the hot reaction mixture some charring and destruction of catalyst occurred and the resulting dehydrated oil was darker and had a higher hydroxyl value.

Any type of catalyst normally used for the dehydration of castor oil may be used in our process. Solid materials such as active earths may be used since the vigorous agitation in the vessel prevents build-up of the catalyst but in general, liquids, for example sulphuric, phosphoric and phosphorous acids are preferred. Sulphonic acid catalysts such as benzene sulphonic acid and chlorsulphonic acid may be used though their efficiency is rather less than that of sulphuric acid. Chlorsulphonic acid in particular is notable since like phosphorous acid it gives a paler dehydrated oil than does sulphuric acid. Due to the oil/catalyst mixture being maintained at an elevated temperature for only a short time, it is possible to use concentrations of catalyst higher than those used in batch processes. This in turn results in shorter reaction times being made possible, though the high concentration of some catalysts may considerably darken the dehydrated oil. However, in the temperature range above 300° C. a good degree of dehydration may be obtained in a short reaction time without having to use the higher catalyst concentrations and under these conditions, as is shown in Example IV, it is possible to produce a very low viscosity dehydrated oil of good colour.

What we claim is:

1. A process of dehydrating castor oil comprising continuously passing castor oil and a dehydration catalyst into a vessel in which the mixture is vigorously agitated and maintained at a temperature of 260–375° C., the treated oil being withdrawn from the vessel at such a rate as to maintain a substantially constant volume of liquid in the vessel, the ratio of the said volume to the volume of castor oil added per minute being from 0.5:1 to 10.0:1, and the castor oil withdrawn from the vessel being at least about 85% dehydrated.

2. A process as claimed in claim 1 in which the dehydration reaction is carried out at a pressure not substantially greater than atmospheric.

3. A process as claimed in claim 1 in which the reaction mixture has a free exposed surface through which the water vapour produced may be continuously evolved during the reaction.

4. A process as claimed in claim 1 in which the dehydration reaction is carried out at a temperature above 300° C.

5. A process as claimed in claim 1 in which the dehydrated oil withdrawn from the vessel is rapidly cooled to a temperature below 200° C.

6. A process as claimed in claim 1 in which at least part of the oil is preheated before entering the reaction vessel.

7. A process as claimed in claim 6 in which the oil is preheated in the absence of catalyst.

8. A process as claimed in claim 1 in which the catalyst is concentrated sulphuric acid.

9. A process as claimed in claim 1 in which increased output is obtained by employing a plurality of vessels in parallel.

10. A process of dehydrating castor oil comprising continuously passing castor oil and a dehydration catalyst into a vessel in which the mixture is vigorously agitated and maintained at a temperature of 260° to 375° C., the treated oil being withdrawn from the vessel at such a rate as to maintain a substantially constant volume of liquid in the vessel, the ratio of the said volume to the volume of castor oil added per minute being from 0.5:1 to 10.0:1.

References Cited in the file of this patent

UNITED STATES PATENTS 2,428,673    Miller _____ Oct. 7, 1947
2,567,925    Colbeth _____ Sept. 8, 1951